(12) United States Patent
Berger et al.

(10) Patent No.: US 7,840,801 B2
(45) Date of Patent: Nov. 23, 2010

(54) ARCHITECTURE FOR SUPPORTING ATTESTATION OF A VIRTUAL MACHINE IN A SINGLE STEP

(75) Inventors: Stefan Berger, New York, NY (US);
Kenneth A. Goldman, Norwalk, CT (US); Ronald Perez, Mount Kisco, NY (US); Reiner Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/624,911

(22) Filed: Jan. 19, 2007

(65) Prior Publication Data
US 2008/0178176 A1    Jul. 24, 2008

(51) Int. Cl.
*G06F 9/445* (2006.01)
*H04L 29/10* (2006.01)
*G06F 15/177* (2006.01)

(52) U.S. Cl. .......................... 713/164; 713/2; 713/176; 713/194; 726/26

(58) Field of Classification Search .................. 726/26; 713/2, 164, 176, 194
See application file for complete search history.

(56) References Cited

U.S. PATENT DOCUMENTS

| | | | |
|---|---|---|---|
| 6,990,579 | B1 | 1/2006 | Herbert |
| 2005/0132031 | A1 | 6/2005 | Sailer et al. |
| 2007/0056033 | A1* | 3/2007 | Grawrock ..................... 726/15 |
| 2008/0114989 | A1* | 5/2008 | Anbalagan et al. .......... 713/189 |

OTHER PUBLICATIONS

Trusted Computing Group, TPM Main, Part 1 Design Principles, Specification Version 1.2, 150 pages, Published Oct. 2, 2003.
Trusted Computing Group, TPM Main, Part 2 TPM Structures, Specification Version 1.2, 164 pages, Published Oct. 2, 2003.
Trusted Computing Group, TPM Main, Part 3 Commands, Specification Version 1.2, 257 pages, Published Oct. 2, 2003.
"vTPM: Virtualizing the Trusted Platform Module", Stefan Berger et al., 15th Usenix Security Symposium, Aug. 2-4, 2006, Vancouver, Canada, 16 pages.
"Design and Implementation of a TCG-based Integrity Measurement Architecture", Reiner Sailer et al., 13 Usenix Security Symposium, Aug. 2004, San Diego, California, 16 pages.
U.S. Appl. No. 11/242,673, filed Oct. 3, 2005, entitled "Dynamic Creation and Hierarchial Organization of Trusted Platform Modules".

* cited by examiner

*Primary Examiner*—Michael J Simitoski
(74) *Attorney, Agent, or Firm*—Cantor Colburn LLP; Preston Young (57) ABSTRACT

The presented method allows a virtual TRUSTED PLATFORM MODULE (TPM) instance to map the Platform Configuration Registers (PCR) register state of a parent virtual TPM instance into its own register space and export the state of those registers to applications inside the virtual machine associated with the virtual TPM instance. Through the mapping of PCR registers, the procedure of attesting to the overall state of a virtual machine can be accelerated, since the state of all measurements relevant to the trustworthiness of a virtual machine are all visible in the combined view of mapped and non-mapped PCR registers. Registers that are mapped into the register space of a virtual TPM instance reflect the state of trustworthiness of those virtual machines that were involved in the creation of the virtual machine that is being challenged.

20 Claims, 5 Drawing Sheets

ARCHITECTURE FOR SUPPORTING ATTESTATION OF A VIRTUAL MACHINE IN A SINGLE STEP

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to improving the performance of attestation to the state of virtual machines on virtualizeable computer systems through a single-step attestation process.

2. Description of Background

The TRUSTED COMPUTING GROUP (TCG) has defined a transitive trust model architecture where software measures the next layer of software before that layer is executed. The digests of these measurements are extended through a one-way hash function into Platform Configuration Registers (PCRs) contained in a TRUSTED PLATFORM MODULE (TPM). The names of the measured file or data and the digest values are appended to a list of measurements. The overall procedure begins with a Core Root of Trusted for Measurement (CRTM), which is code that is run early in the boot process after a computer system has been started.

During the remote attestation process, a set of PCRs is quote-digested and digitally signed with a trusted signing key, such as for example an Attestation Identity Key (AIK). The remote party/system validates the AIK certificate issued by a trusted privacy certificate authority, the digital signature of the quote, and the integrity of the measurement list by comparing it to the PCR state included in the quote. Once the measurement list has been evaluated, the remote system uses it to determine whether the attesting system is running trusted software.

In an exemplary embodiment, evaluating the state of a software environment means to replay the log of all hashes of software that was started on the system. If one or multiple pieces of software were started on a system that is determined to be untrusted, the whole system may be declared as untrusted. Untrusted software may be recognized through a hash that explicitly identifies a piece of software to be untrusted or through a hash that is not known to the evaluating system. The replay of the log of all hashes has to match with the state of the PCR registers that affected these logs and were returned in a quote. Further, the signature over the state of the PCR registers must be verifiable.

Virtualizeable systems allow users to spawn multiple virtual machines (VM) that each can run an Operating System independently from those of other VMs. An implementation of such a system may offer the capability to spawn new VMs from within a VM, thus creating a hierarchy of VMs with a parent-child relationship between creating and created VMs. On many virtualizeable systems an initial VM is created during system boot. This VM serves for system management purposes and is for example used for the creation and destruction of other VMs.

For the purpose of supporting trusted computing in a virtualizeable system it is expected that within each VM software is running that implements support for the transitive trust model architecture described previously. An outside challenger who wants to establish trust into a VM would not only be interested in establishing trust into the software running inside of that VM, but also in the software that has been used to start this VM from inside its parent VM. This includes the operating system inside the parent VM, applications involved in the process of starting a VM, the underlying virtualization layer (hypervisor), and all other layers used during system startup including the CRTM.

In a typical system, the trust establishment would require a challenger to perform several different steps by individually challenging all VMs on the direct path (in the hierarchy) from the root VM to the one of interest. This is regarded as necessary since all these VMs are part of the trust chain to the one of interest. If one of these VMs is untrusted, its descendants are also untrusted. The proposed architecture, that in part gives rise to the present invention, creates a solution that allows more efficient support for establishing trust into a VM by allowing a one-step attestation process.

SUMMARY OF THE INVENTION

The shortcomings of the prior art are overcome and additional advantages are provided through the provision of a method of mapping platform configuration registers of a TRUSTED PLATFORM MODULE or virtual TRUSTED PLATFORM MODULE instance into the register space of a virtual TRUSTED PLATFORM MODULE, said method comprising: reading a state of a platform configuration register from an internal state of the processing TRUSTED PLATFORM MODULE if the platform configuration register is a non-mapped platform configuration register; and requesting selectively the state of a plurality of mapped platform configuration registers from a source providing the plurality of mapped platform configuration registers.

Also, the shortcomings of the prior art are overcome and additional advantages are provided through the provision of a computer readable medium for remotely attesting to the state of a virtual machine, said computer readable medium comprising: a program code for controlling a computer system, said controlling further comprising: sending a request to said virtual machine for quoting a plurality of mapped platform configuration registers and a plurality of non-mapped platform configuration registers; receiving a plurality of quote signatures covering the plurality of mapped platform configuration registers and the plurality of non-mapped platform configuration registers of the request in a quote response; and evaluating the current state of the virtual machine.

Also, the shortcomings of the prior art are overcome and additional advantages are provided through the provision of a method of attesting to a plurality of child virtual machines that are direct descendants of a parent virtual machine, the method comprising: sending a quote request for quoting a plurality of mapped platform configuration registers and a plurality of non-mapped platform configuration registers to a first child virtual machine; and receiving results of the quote request and evaluating the current state of the first child virtual machine, the first child virtual machine having a first child state. The state of one or multiple parent virtual machines is described through the state of mapped platform configuration registers. If the state of those registers is determined to represent the state of one or multiple parent virtual machines that is untrusted, the first child virtual machine is declared as untrusted as well as all other child virtual machines, since they are all direct descendants of that untrusted parent virtual machine. Otherwise the state of those registers represents the state of one or multiple trusted parent virtual machines. Further the state of the child virtual machine is evaluated through the state of the non-mapped platform configuration registers. If the state of the child virtual machine is declared as trusted, the state of all mapped platform configuration registers is remembered. When quote requests are sent to the other child virtual machines, the state of mapped platform configuration registers is only evaluated if it has changed since their previous evaluation. The state of the child virtual machine is evaluated through the state of its non-mapped platform configuration registers. This process is repeated until all child virtual machines have been evaluated. If during the evaluation of all child virtual machines the state of mapped platform registers is determined to represent an untrusted state, then child virtual machines that have previously been declared to be trusted may now be declared to be untrusted.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which through the mapping of PCR registers, the procedure of attesting to the overall state of a virtual machine can be accelerated, since the state of all measurements relevant to the trustworthiness of a virtual machine are all visible in the combined view of mapped and non-mapped PCR registers.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Turning now to the drawings in greater detail, the present invention allows a virtual TPM instance to map the PCR register state of a parent virtual TPM instance into its own register space and export the state of those registers to applications inside the virtual machine associated with the virtual TPM instance. Through the mapping of PCR registers, the procedure of attesting to the overall state of a virtual machine can be accelerated, since the state of all measurements relevant to the trustworthiness of a virtual machine are all visible in the combined view of mapped and non-mapped PCR registers. Mapped registers reflect the state of trustworthiness of those virtual machines that were involved in the creation of the virtual machine that is being challenged.

Virtualizeable systems allow users to spawn multiple VMs that each can run an Operating System. In many virtualizeable systems an initial VM is created automatically during startup of the system and used for system management purposes, such as creation and destruction of other VMs. For the purpose of building architecture supporting trusted computing, this initial Operating System also logically owns device access to the hardware TPM of the system and runs software supporting the aforementioned transitive trust model architecture.

In a virtualizeable system, a virtualized TRUSTED PLATFORM MODULE (vTPM) offers trusted computing functionality to each VM that is started after the VM that is hosting the vTPM. The vTPM is typically hosted in the management VM. The vTPM's primary task is to spawn a virtual TPM instance for each VM requiring access to TPM functionality. Each created virtual TPM instance is then associated with a VM throughout the lifetime of that VM. Such a virtual TPM instance then offers the full TPM functionality to its associated VM as the hardware TPM does to the management VM. This includes providing access to a set of PCR registers that can be controlled by software running inside the VM.

It is expected that Operating System software running inside each VM also implements the previously described transitive trust model architecture and takes measurements of each piece of software before execution control is transferred to that software. This measurement-taking software can be designed such that the digest of the measurements are extended into a PCR register whose index is distinct from the ones of the measurement-taking software inside the VM hosting the vTPM. For practicality reasons that index would typically be an increment of one compared to the highest PCR register index used by measurement-taking software inside the parent VM.

An outside challenger who is interested in establishing trust into a VM is not only interested in the software that is running inside that VM, but also needs to be able to establish trust into other components of the system. This includes the software layers up to the CRTM, such as the previously mentioned hierarchy of VMs and the software running inside of each VM, the hypervisor of the system, the used boot loader and others pieces of software.

The proposed architecture allows a challenger to establish trust into any VM by only challenging that VM. The single challenge reveals all relevant measurements and the log of names of measured applications and data such that the challenger can decide about whether to establish trust into a VM. This result is achieved through mapping a subset of PCR registers of the parent VM into the set of PCR registers of the challenged VM. The mapped registers include all the ones used by software implementing the transitive trust model architecture. Furthermore, a driver inside the challenged VM is implemented such that the part of the measurement log-affecting mapped PCR registers can be fetched from the parent VM. PCR registers that are mapped into the PCR register set of a virtual TPM instance cannot be extended but are read-only since they are not logically owned by that virtual TPM instance. All non-mapped register can be modified as usual. It should be noted that mapping of PCR registers is an optional feature and virtual TPM instances can still be created, even on the same system, that do not map any of the parent TPM's PCR registers into their space. It should also be noted that this architecture can map a subset of the hardware TPM's PCR register into the space of each virtual TPM.

Figure 1:
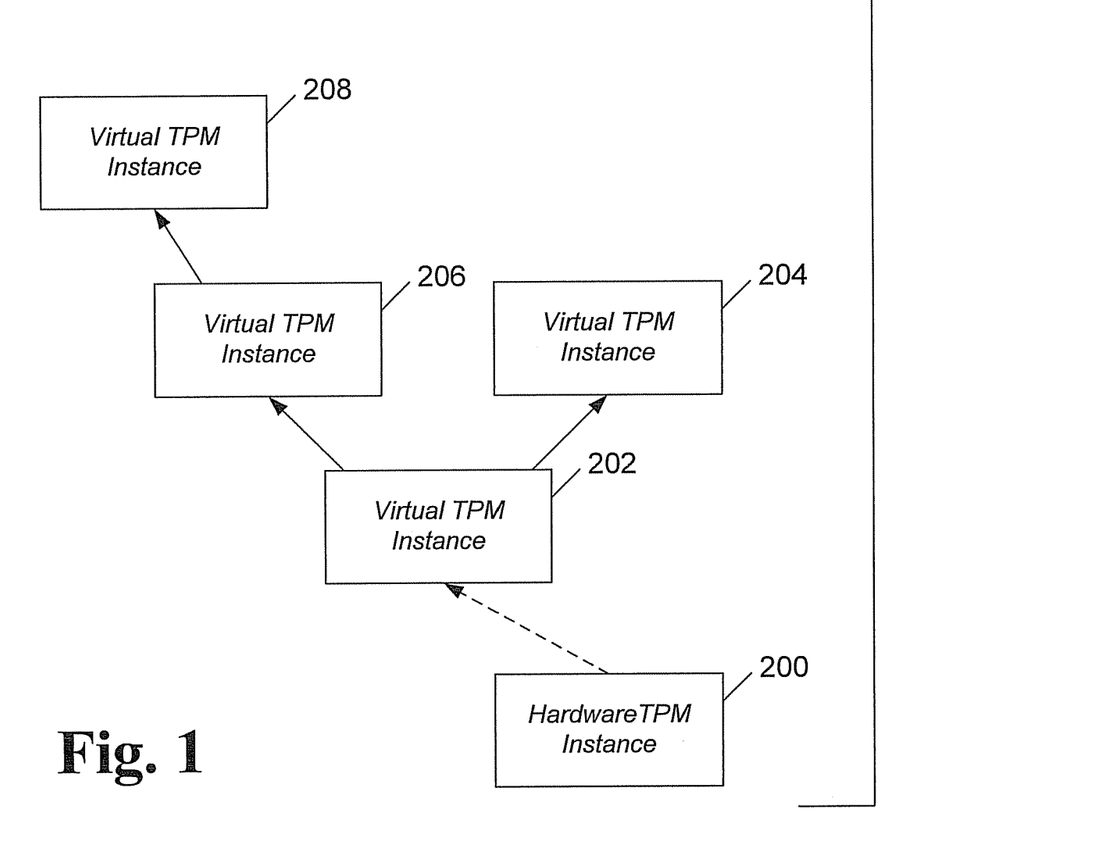
FIG. 1 illustrates one example of the parent-child relationship of virtual TPM instances in a system.

Referring to FIG. 1 there is illustrated one example of the parent-child relationship between virtual TPM instances in a system. In an exemplary embodiment, the virtual TPM instance 202 can be regarded as the root virtual TPM instance with two child virtual TPM instances 204 and 206. Virtual TPM instance 208 is the child virtual TPM instance of virtual TPM instance 206. The hardware TPM 200 is a system's hardware TPM and shown for completeness reasons.

Figure 2:
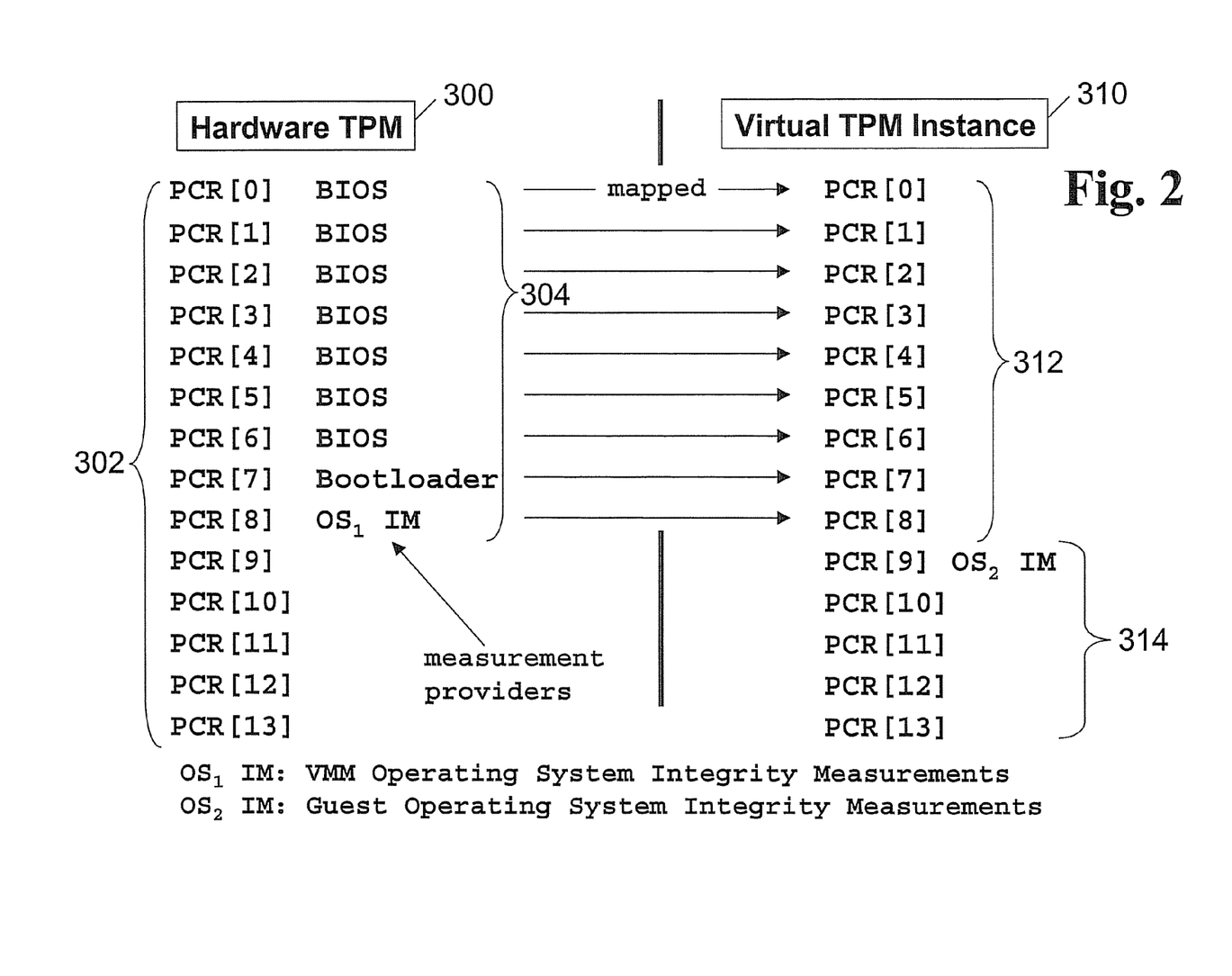
FIG. 2 illustrates one example of the mapping of the hardware TPM's registers into the register space of a virtual TPM instance.

Referring to FIG. 2 there is illustrated one example of the mapping of a subset of the hardware TPM's PCR registers into the register space of a virtual TPM instance. In an exemplary embodiment, hardware TPM 300, which corresponds to the hardware TPM 200 in FIG. 1, has a set of PCR registers 302 of which a subset 304 of those registers is mapped into the PCR register set of a virtual TPM instance 310, which for example corresponds to the virtual TPM instance 202 in FIG. 1. Various programs are using the mapped registers 304 and implement the transitive trust model architecture. Such application programs may include a PC's BIOS, the boot loader and an integrity measurement architecture running inside the virtual machine that is associated with the hardware TPM.

In an exemplary embodiment, it should be noted that an implementation of a virtual TPM can be made completely in hardware. In such a configuration, the hardware TPM 200 would not map its platform configuration registers into the register space of any virtual TPM instance of such a virtual TPM.

The PCR register set 304 that is mapped into the register space of the virtual TPM offers read-only registers 312 to applications communicating with the virtual TPM instance 310. All other registers 314 of the virtual TPM instance 310 can be modified by applications communicating with the virtual TPM instance. Inside the virtual machine that is associated with the virtual TPM instance 310 an integrity measurement architecture is running and using one of the non-mapped registers that allow modifications (read and write access). It should be appreciated that not only the hardware TPM 300 as illustrated in FIG. 2 can provide platform configuration registers for mapping, but also the Virtual Trusted Platform 310 module instance can provide platform configuration registers for mapping into the register space of one or multiple of its child virtual TPM instances, such as for example virtual TPM instances 202, 206, and 208 in FIG. 1.

Figure 3:
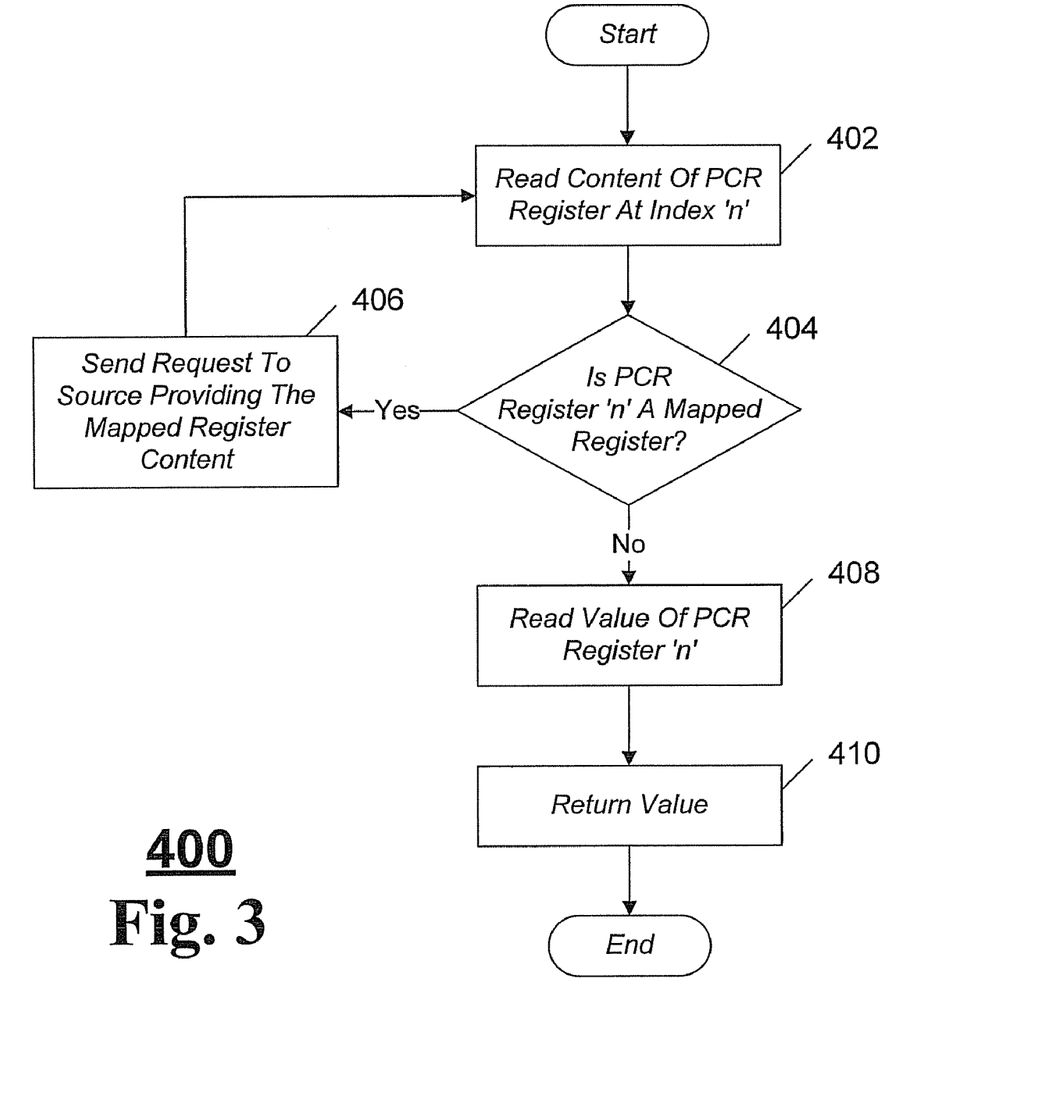
FIG. 3 illustrates one example of a method illustrating the process of reading the PCR register values from the virtual TPM instance's internal state or from the source providing the mapped registers.

Referring to FIG. 3 there is illustrated one example of a method illustrating the process of reading the PCR register values from the virtual TPM instance's internal state or from the source providing the mapped registers.

In this regard, in an exemplary embodiment, the present invention provides a method for mapping PCR registers of a parent virtual TPM instance or the hardware TPM into the PCR register space of a virtual TPM instance, comprising: receiving a request to read the state of a PCR register, and determining whether the index of the PCR register corresponds to a PCR register that is mapped; and reading the state of the PCR register from the source providing the mapped PCR register if it is a mapped PCR register, or reading the state of the PCR register from the virtual TPM instance's internal state if it is not a mapped PCR register; and returning the state of the PCR register. The method 400 begins in block 402.

In block 402 the contents of a PCR register 'n' whose contents may either be mapped or not mapped is read. The request to read the content of a PCR register is received by a virtual TPM instance or the hardware TPM. Processing then moves to decision block 404.

In decision block 404 a determination is made as to whether the PCR register 'n' is a mapped register or a register whose contents are fully managed by the virtual TPM instance. If the resultant is in the affirmative that is the PCR register 'n' is a mapped register the processing moves to block 406. If the resultant is in the negative that is the PCR register 'n' is not mapped then processing moves to block 408.

In block 406, in an exemplary embodiment, if it is determined in decision block 404 that the register is a mapped register, then a request for reading the register content is formulated and sent to the source providing the mapped register. Processing then returns to block 402 of the parent TPM, which receives the request.

In block 408, if it is determined in decision block 404 that the register is owned by the entity evaluating the request, thus a negative resultant in decision block 404, then the register content is read from the internal state. Processing then moves to block 410.

In block 410 the value is returned and the routine is exited.

Figure 4:
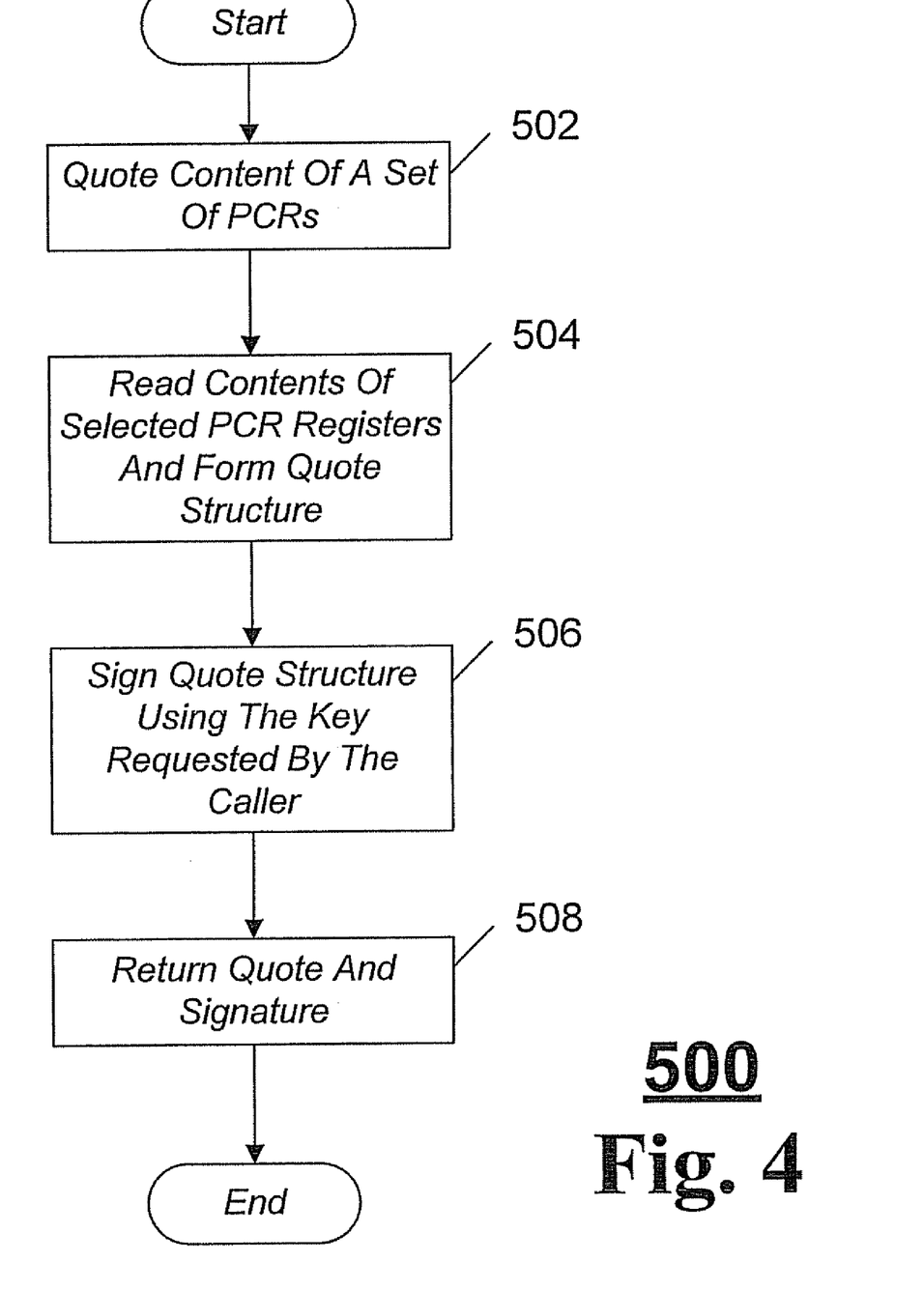
FIG. 4 illustrates one example of a method illustrating the process of quoting a set of PCR registers containing mapped and non-mapped registers using a key that is owned by the virtual TPM instance.

Referring to FIG. 4 there is illustrated one example of a method illustrating the process of quoting a set of PCR registers containing mapped and non-mapped registers using a key that is owned by the virtual TPM instance. In an exemplary embodiment, routine 500 effectuates a method of quoting the contents of PCR registers using a given key. The method begins in block 502.

In block 502 a request to quote the contents of a set of PCR registers is received by the virtual TPM instance or the hardware TPM. Processing then moves to block 504.

In block 504 the contents of all mapped and non-mapped PCR registers are read from their sources according to the procedure described in routine 400. Processing then moves to block 506. In block 506, in accordance to the policy of the system or the implementation of the entity handling the request, the signature for the quote response is made using a key owned by this entity. Processing then moves to block 508.

In block 508 the resulting signature and quote are returned to the caller. The routine is then exited.

Figure 5:
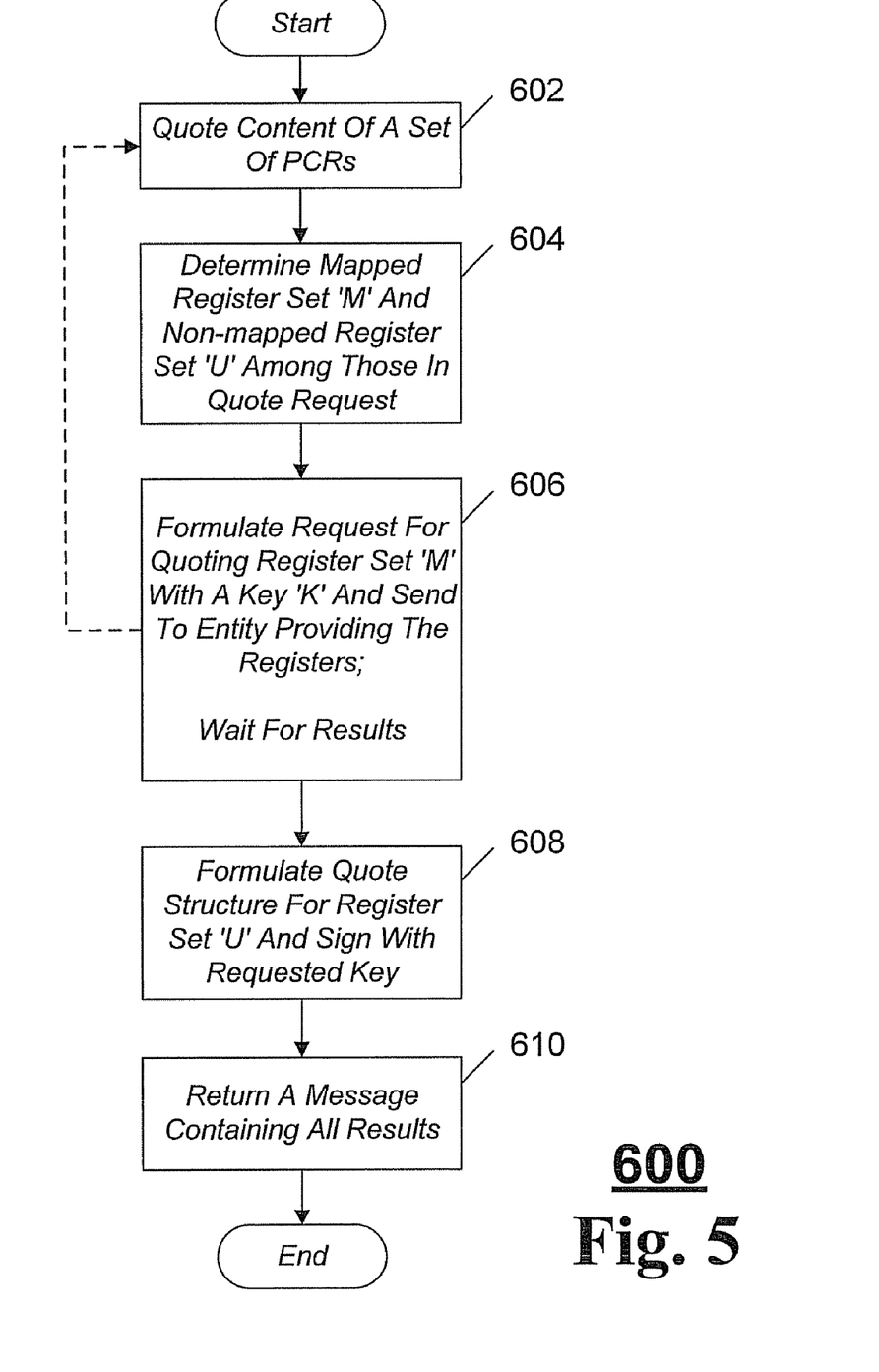
FIG. 5 illustrates one example of a method illustrating the process of quoting a set of PCR registers using keys that are owned by the virtual TPM instances or the hardware TPM that maps the registers.

Referring to FIG. 5 there is illustrated one example of a method 600 illustrating the process of quoting a set of PCR registers using keys that are owned by the virtual TPM instances or the hardware TPM that maps the registers. The method begins in block 602.

In block 602, in an exemplary embodiment, the request to quote the contents of a set of PCR registers is received by the virtual TPM instance or the hardware TPM. Processing then moves to block 604.

In block 604 a determination is made as to which of the registers selected for quoting by the caller are mapped registers 'M' and non-mapped registers 'U'. Processing then moves to block 606.

It should be noted that the mapping of the PCR registers into the PCR register set of a virtual TPM instance also has an effect on how the virtual TPM instance can issue quotes for different combinations of PCR register sets spanning only mapped registers 'M', only non-mapped registers 'U' or both types of mapped and non-mapped PCR registers 'M' and 'U'. Three combinations of requests for signing the state of PCR registers are possible. These options include:

1. A request for a quote that involves only mapped PCR registers 'M'. In this case the virtual TPM instance may forward the request to the parent virtual TPM instance or the hardware TPM requesting a signature using that TPM's signing key, i.e., AIK, or it may issue a signature over the PCR registers itself, depending on the policy of the system.

2. A request for a quote that involves only non-mapped PCR registers 'U'. In this case the virtual TPM instance issues the signature using its own signing key, i.e., AIK; and 3. A request for a quote that involves mapped registers 'M' and non-mapped PCR registers 'U'. In this case the virtual TPM could split up the quote request in two sub-requests. The one sub-request would span only mapped PCR registers 'M' and would be forwarded as a quote request to the parent virtual TPM instance, which would treat the request according to these rules. The other sub-request would only cover non-mapped PCR registers 'U' and would be treated according to option 2 above.

In block 606 a request for a quote of the register set 'M' is sent to the parent virtual TPM instance or the hardware TPM along with the handle of a key that can perform the signing of the quote. It is 'waited' until the response, a signature over the state of the register set 'M', has been returned. To process such a request, execution returns to block 602 and resumes in 606 when the response has been received. Processing then moves to block 608. In block 608 the quote response for the non-mapped registers 'U' is formed and a signature is provided. Processing then moves to block 610.

In block 610 results from blocks 606 and 608 are combined in a response and returned to the caller. The routine is then exited.

In an exemplary embodiment, the present invention provides a method for mapping PCR registers of a parent virtual TPM instance or the hardware TPM into the PCR register space of a virtual TPM instance, comprising: receiving a request to extend the state of a PCR register, and determining whether the index of the PCR register corresponds to a PCR register that is mapped; returning an error value if it is a mapped PCR register, or extending the state of the PCR register held in the virtual TPM instance's internal state if it is not a mapped PCR register; and storing the extended state into the PCR register.

Another exemplary embodiment of the present invention provides a method of a virtual TPM instance to quote a set of PCR registers, comprising: determining that the set of PCRs spans only non-mapped PCR registers and forming and signing the quote using the virtual TPM instance's own signing key (i.e., AIK); determining that the set of PCR registers spans only mapped PCR registers and forwarding the quote request to the parent virtual TPM instance or hardware TPM for quoting; determining that the set of PCR registers spans mapped and non-mapped PCR registers and determining the policy for issuing quote signatures for this case; reading the state of the PCR registers from their appropriate sources and signing the quote using the virtual TPM instance's attestation identity key in accordance to the policy of the system; or reading the state of the PCR registers and signing the non-mapped registers with the virtual TPM instance's signing key and formulating a quote request for the mapped PCR registers and forwarding the request to the parent virtual TPM instance or hardware TPM for performing the quote.

Another exemplary embodiment of the present invention provides a method to challenge a virtual machine by sending a single request for quoting of a set of PCR registers and a request for the log of measurements affecting the quoted set of PCR registers, comprising: formulating and sending the request for quoting a set of PCR registers to the challenged VM; receiving the response from the challenged VM containing one or multiple quotes and a log of measurements; determining which subset of PCR registers has been quoted with which signing key; verifying each quote signature individually; evaluating those entries in the log of measurements that affected the set of PCRs contained in the quote; determining whether to establish trust into a VM based on the software that has been started on the remote system.

Another exemplary embodiment of the present invention provides a method for efficient large-scale trust establishment into VMs running on a particular system comprising: sending a quote request and evaluating its response to a first VM according to the previously described aspect of the invention; remembering the state of mapped PCR registers for subsequent evaluations; sending quote requests to each subsequent VM on the same system and determining that the state of mapped register has not changed and requesting measurement logs only for those platform configuration registers whose value is different than those that have previously already been evaluated and evaluating the state of the system.

Another exemplary embodiment of the present invention provides a method for efficiently determining the trustworthiness of child VMs in a system, comprising: determining that a VM is declared not trustworthy and therefore declaring all its descending VMs, such as for example its child-VMs, as not trustworthy.

Therefore, the present invention provides a method, system and program product to efficiently challenge and establish trust into a VM by establishing trust into all relevant pieces of software affecting the trustworthiness of a VM.

The capabilities of the present invention can be implemented in software, firmware, hardware or some combination thereof. In an embodiment of the present invention, a virtual TPM that has the capability to map PCR registers into the register space of virtual TPM instances can be implemented in software. It may have the ability to map the registers of a present hardware TPM into the register space of one or multiple of its virtual TPM instances. In another embodiment of the present invention, a virtual TPM with those capabilities may be fully implemented in a piece of hardware.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Computer readable media can include transitory and non-transitory mediums.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of mapping platform configuration registers (PCRs) of a TRUSTED PLATFORM MODULE (TPM) or virtual TRUSTED PLATFORM MODULE (vTPM) instance into the register space of a child vTPM, said method comprising:

receiving a request to read a state of a Platform Configuration Register (PCR) of the child vTPM;

requesting from a parent of the child vTPM the value of the PCR in response to determining that the PCR is mapped to the parent TPM, the parent TPM comprising one of a TPM or a vTPM;

requesting from the child vTPM the value of the PCR in response to determining that the PCR is not mapped to the parent TPM; and returning the value of the PCR in response to the receiving.

2. The method in accordance with claim 1, further comprising:

allowing read-only access to said mapped PCR.

3. The method in accordance with claim 2, further comprising:

allowing read and write access to all of a plurality of non-mapped PCR.

4. The method in accordance with claim 1, further comprising:

creating a vTPM instance with parameters to request mapping of at least one of said PCRs from at least one other vTPM instance or hardware TPM.

5. The method in accordance with claim 4, further comprising:

signing said state of at least one of a plurality of non-mapped PCR from a part of a quote request with a key owned by a current processing TPM.

6. The method in accordance with claim 5, further comprising:

signing said state of at least one of said plurality of mapped PCR from a subset of PCRs requiring signing through said quote request, that covers mapped PCRs, with said key owned by a current processing vTPM instance.

7. The method in accordance with claim 5, further comprising:

forwarding the part of said quote request that requires the signing of at least one of said plurality of mapped PCRs to at least one of a source TPM that owns certain of said PCRs and requesting the signature to be issued by a second key owned by said source TPM.

8. The method in accordance with claim 6, further comprising:

combining a plurality of said quote results covering said plurality of mapped PCRs and said plurality of non-mapped PCRs into a quote response; and returning said quote response.

9. A non-transitory computer readable medium for remotely attesting to the state of a virtual machine, said computer readable medium comprising:

a program code for causing a computer system to perform the following:

sending a request to said virtual machine for quoting a plurality of mapped PCRs and a plurality of non-mapped PCRs, wherein sending includes requesting from a parent of a child vTPM the value of a PCR in response to determining that the PCR is mapped to the parent TPM;

receiving a plurality of quote signatures covering said plurality of mapped PCRs and said plurality of non-mapped PCRs of said request in a quote response; and evaluating the current state of said virtual machine, the evaluating comprising reviewing entries in a log of measurements that affected the PCRs contained in the quote response.

10. The computer readable medium in accordance with claim 9, wherein said controlling further comprises:

determining which of said plurality of mapped PCRs and said plurality of non-mapped PCRs were signed with a key owned by a TRUSTED PLATFORM MODULE (TPM) that is associated with said virtual machine.

11. The computer readable medium in accordance with claim 10, wherein said controlling further comprises:

validating at least one of a plurality of quote signatures in said quote response, wherein said plurality of quote signatures covers at least one of said plurality of mapped PCRs and said plurality of non-mapped PCRs.

12. The computer readable medium in accordance with claim 9, wherein said controlling further comprises:

declaring said virtual machine as untrusted as a result of evaluation and further declaring a plurality of child virtual machines created by said virtual machine as untrusted.

13. A method of attesting to a plurality of child virtual machines that are direct descendants of a parent virtual machine, said method comprising:

sending a quote request for quoting a plurality of mapped PCRs and a plurality of non-mapped PCRs to a first child virtual machine, wherein sending a quote request includes requesting from a parent of a child vTPM the value of a PCR in response to determining that the PCR is mapped to the parent TPM; and receiving results of said quote request and evaluating the current state of said first child virtual machine, said first child virtual machine having a first child state.

14. The method in accordance with claim 13, further comprising:

identifying certain PCRs as said plurality of non-mapped PCRs and all other PCRs as said plurality of mapped PCRs.

15. The method in accordance with claim 14, further comprising:

determining whether said first child state of said first child virtual machine is trusted by evaluating said first child state of said first child virtual machine through evaluating the state of said plurality of non-mapped PCRs.

16. The method in accordance with claim 15, further comprising:

evaluating the state of other trust-relevant software through evaluating the state of said plurality of mapped PCRs and determining that the state caused by said other trust-relevant software is trustworthy.

17. The method in accordance with claim 15, further comprising:

evaluating the state of a plurality of other trust-relevant software through evaluating the state of said plurality of mapped PCRs and determining that the state caused by said plurality of the other trust-relevant software is not trustworthy and thus declaring the state of all of a plurality of child virtual machines as untrustworthy.

18. The method in accordance with claim 16, further comprising:

sending a plurality of quote requests to said plurality of other child virtual machines for quoting a set of said plurality of mapped PCRs and said plurality of non-mapped PCRs.

19. The method in accordance with claim 18, further comprising:
   determining that the state of said plurality of mapped PCRs has not changed since attestation to said first child virtual machine.

20. The method in accordance with claim 19, further comprising:
   evaluating the state of each of said plurality of other said child virtual machines by only evaluating said plurality of PCRs that are determined not to be part of said plurality of mapped PCRs.

* * * * *